United States Patent
Kawai et al.

(10) Patent No.: US 11,283,111 B2
(45) Date of Patent: Mar. 22, 2022

(54) SECONDARY BATTERY AND METHOD OF MANUFACTURING THE SAME

(71) Applicant: Murata Manufacturing Co., Ltd., Nagaokakyo (JP)

(72) Inventors: Toru Kawai, Nagaokakyo (JP); Masahiro Otsuka, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 94 days.

(21) Appl. No.: 16/458,438

(22) Filed: Jul. 1, 2019

(65) Prior Publication Data
US 2019/0326647 A1    Oct. 24, 2019

Related U.S. Application Data

(63) Continuation of application No. PCT/JP2018/000472, filed on Jan. 11, 2018.

(30) Foreign Application Priority Data

Feb. 22, 2017  (JP) .............................. JP2017-031254

(51) Int. Cl.
*H01M 10/0525* (2010.01)
*H01M 10/0587* (2010.01)
(Continued)

(52) U.S. Cl.
CPC ... *H01M 10/0587* (2013.01); *H01M 10/0525* (2013.01); *H01M 50/538* (2021.01); *H01M 50/543* (2021.01)

(58) Field of Classification Search
None
See application file for complete search history.

(56) References Cited

U.S. PATENT DOCUMENTS

| | | |
|---|---|---|
| 6,635,381 B2 | 10/2003 | Spillman et al. |
| 6,689,511 B2 | 2/2004 | Yamada et al. |

(Continued)

FOREIGN PATENT DOCUMENTS

| | | |
|---|---|---|
| JP | 2001167743 A | 6/2001 |
| JP | 2001357892 A | 12/2001 |

(Continued)

OTHER PUBLICATIONS

International Search Report issued in PCT/JP2018/000472, dated Mar. 6, 2018.

(Continued)

*Primary Examiner* — Haroon S. Sheikh
(74) *Attorney, Agent, or Firm* — Arent Fox LLP

(57) ABSTRACT

A method of manufacturing a secondary battery is provided for manufacturing a secondary battery that includes an electrode winding body formed of a positive electrode and a negative electrode, and having a non-rectangular shape in planar view. In this manufacturing method, a positive electrode precursor and a negative electrode precursor are stacked on each other with a separator interposed therebetween to form an electrode precursor laminate, which is wound to form the electrode winding body. Moreover, the electrode precursor laminate has a comb-teeth shape in planar view, and winding is performed such that a winding axis for winding is substantially parallel to an extending direction of a terminal element of the secondary battery, whereby the electrode winding body is made non-rectangular.

16 Claims, 8 Drawing Sheets

(51) Int. Cl.
*H01M 50/538* (2021.01)
*H01M 50/543* (2021.01)

(56) References Cited

U.S. PATENT DOCUMENTS

| | | |
|---|---|---|
| 9,225,034 B2 | 12/2015 | Ryu et al. |
| 9,231,279 B2 | 1/2016 | Kwon et al. |
| 9,373,865 B2 | 6/2016 | Holl et al. |
| 9,893,376 B2 | 2/2018 | Yang et al. |
| 2001/0005561 A1 | 6/2001 | Yamada et al. |
| 2002/0122975 A1 | 9/2002 | Spillman et al. |
| 2010/0081042 A1* | 4/2010 | Morishima ............ H01M 4/70 429/94 |
| 2014/0050959 A1 | 2/2014 | Ryu et al. |
| 2014/0053383 A1* | 2/2014 | Holl ...................... H01G 9/008 29/25.41 |
| 2015/0221988 A1 | 8/2015 | Kwon et al. |
| 2016/0049687 A1 | 2/2016 | Yang et al. |

FOREIGN PATENT DOCUMENTS

| | | |
|---|---|---|
| JP | 2014519145 A | 8/2014 |
| JP | 2014522558 A | 9/2014 |
| JP | 2015501076 A | 1/2015 |
| JP | 2015536036 A | 12/2015 |
| WO | 2017209052 A1 | 12/2017 |

OTHER PUBLICATIONS

Written Opinion of the International Searching Authority issued in PCT/JP2018/000472, dated Mar. 6, 2018.

* cited by examiner

SECONDARY BATTERY AND METHOD OF MANUFACTURING THE SAME

CROSS REFERENCE TO RELATED APPLICATIONS

The present application is a continuation of PCT/JP2018/000472 filed Jan. 11, 2018, which claims priority to Japanese Patent Application No. 2017-031254, filed Feb. 22, 2017, the entire contents of each of which are incorporated herein by reference.

TECHNICAL FIELD

The present disclosure relates to a secondary battery and a method of manufacturing the secondary battery. In particular, the present disclosure relates to a method of manufacturing a secondary battery provided with a positive electrode, a negative electrode and a separator, and also relates to a secondary battery obtained by the manufacturing method.

BACKGROUND

Secondary batteries are so-called storage batteries and therefore can be repeatedly charged and discharged, with the secondary batteries being used in various applications. For example, secondary batteries are used for mobile devices such as mobile phones, smart phones and notebook computers.

In general, such secondary batteries include at least a positive electrode, a negative electrode, and a separator therebetween. The positive electrode is formed of a positive electrode material layer and a positive electrode current collector, and the negative electrode is formed of a negative electrode material layer and a negative electrode current collector. Moreover, such a secondary battery has a stacked structure in which an electrode constituting layers including the positive electrode and the negative electrode sandwiching the separator are stacked on top of each other.

Patent Document 1: National Publication of International Patent Application No. 2015-536036.

SUMMARY OF THE INVENTION

The inventor of the present invention identified that it is necessary to consider a balance of an installation space of the secondary battery in a housing with other equipment elements such as a circuit board and various parts. In particular, with the diversification of needs in recent years, the installation space of the secondary battery tends to be further restricted by the housing and various elements contained in the housing, and the shape of the conventional secondary battery cannot sufficiently cope with the tendency.

The secondary battery is often used in a housing together with a substrate (for example, an electronic circuit board represented by a printed circuit board, a protective circuit board and the like). In the combined installation of the substrate and the secondary battery, it is conceivable to make the shape of the secondary battery non-rectangular due to a cutout portion from the viewpoint of effective use of the installation space. The inventors of the present invention have found that in such a case of a non-rectangular secondary battery, an external terminal of the battery needs to be positioned more suitably.

In another exemplary aspect, the secondary battery should have suitable heat dissipation property in terms of, for example, battery characteristics and/or life. In this respect, there is a current situation that the heat dissipation property of the non-rectangular battery has not been sufficiently studied.

In view of the foregoing noted problems, it is a primary object of the present invention to provide a technique for more suitably positioning an external terminal in a non-rectangular secondary battery. Another object is to provide a non-rectangular secondary battery more suitable in terms of heat dissipation property.

Accordingly, an exemplary manufacturing method for a secondary battery according to the present invention is provided with the secondary battery including an electrode winding body formed of a positive electrode and a negative electrode, and having a non-rectangular shape in planar view.

In an exemplary aspect, the manufacturing method includes stacking a positive electrode precursor and a negative electrode precursor on each other with a separator interposed therebetween to form an electrode precursor laminate, and winding the electrode precursor laminate to form the electrode winding body. Moreover, the electrode precursor laminate has a comb-teeth shape in planar view and the winding is performed such that a winding axis for the winding is substantially parallel to an extending direction of a terminal element of the secondary battery. In this aspect, a planar view shape of the electrode winding body is made non-rectangular.

In addition, a secondary battery according to the present invention includes an electrode winding body formed of a positive electrode, a negative electrode, and a separator between the positive electrode and the negative electrode and an exterior body wrapping the electrode winding body.

In this exemplary secondary battery, a planar view shape of the secondary battery is non-rectangular, the electrode winding body has a winding structure in which the positive electrode, the negative electrode, and the separator are integrally wound, and an extending direction of a terminal element of the secondary battery is substantially parallel to a winding axis of the winding structure.

According to the exemplary embodiments of the present disclosure, an external terminal of the battery can be more suitably positioned at a cutout portion (more precisely, a battery surface forming the cutout portion, that is, a battery side surface shaping a battery cutout portion) in a non-rectangular secondary battery. In particular, the external terminal can be positioned in proximity to a battery cutout portion forming a non-rectangular shape. Consequently, when the secondary battery of the exemplary embodiment is used with a substrate in a housing, the substrate can be set to the cutout portion of the secondary battery, and, at the same time, the substrate and the external terminal can be made closer to each other.

If the external terminal and the substrate of the secondary battery are arranged in proximity to each other at the battery cutout portion, wiring from the substrate to the external terminal becomes easier (for example, the wiring can be designed to be shorter). Due to such wiring design, for example, a reduction in electrode loss due to the wiring is further prevented, or a reduction in designability is further decreased. In the first place, such a battery according to the exemplary embodiment can lead to simplification of battery manufacture and reduction in parts cost.

In addition, in an exemplary aspect of the present disclosure, since the external terminal can be more suitably positioned on the battery in relation to the winding, the heat dissipation effect through the external terminal can be improved. That is, although the secondary battery according to the present disclosure is non-rectangular, the secondary battery can exhibit more preferable heat dissipation characteristics.

DETAILED DESCRIPTION

Figure 1:
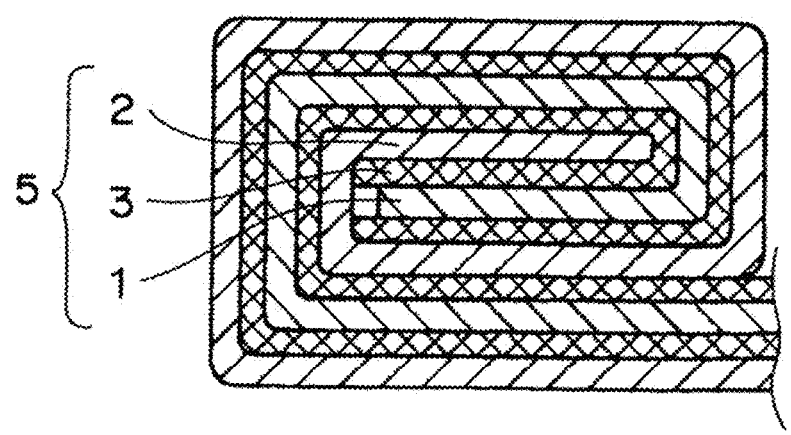
FIG. 1 is a schematic cross-sectional view showing an example of a concept of an electrode forming layer.

Hereinafter, a secondary battery according to an exemplary embodiment of the present invention and a method of manufacturing the secondary battery will be described in more detail. Although description will be made with reference to the drawings as necessary, various elements are schematically and exemplarily shown in the drawings wherein their appearances, their dimensional proportions and the like are not necessarily real ones, and are merely for the purpose of making it easy to understand the present invention.

For purposes of this disclosure, the direction of thickness, which is directly or indirectly used herein, is one based on a stacking direction of electrode materials forming the secondary battery. For example, in the case of a secondary battery having a thickness in a plate shape such as a flat battery, a direction of thickness corresponds to a thickness direction of the secondary battery. It is noted that the term "planar view" used herein is based on a sketch of an object when the object is viewed from above or below along the thickness direction. Moreover, the term "cross-sectional view" used here is based on a virtual cross section of an object obtained by cutting along the thickness direction of the secondary battery.

In addition, the terms "vertical direction" and "horizontal direction" directly or indirectly used here correspond respectively to the vertical direction and the horizontal direction in the drawing. Unless otherwise stated, the same numerals and symbols denote the same members or portions or the same contents. In an exemplary embodiment, it can be grasped that a vertical downward direction (that is, a direction in which gravity acts) corresponds to a "downward direction", and the opposite direction corresponds to an "upward direction".

<<Basic Configuration of Secondary Battery>>

In general, the exemplary embodiments of the present invention relate to a secondary battery and also relates to a method of manufacturing a secondary battery. The term "secondary battery" used here refers to a battery that can be repeatedly charged and discharged. Therefore, the secondary battery obtained by the manufacturing method of the present invention is not limited by its name, and can include, for example, an electric storage device.

According to an exemplary aspect, the secondary battery includes an electrode winding body in which an electrode layer (i.e., an electrode constituting layer or an electrode forming layer) including a positive electrode, a negative electrode and a separator is stacked. FIG. 1 shows a concept of the electrode winding body. As illustrated, a positive electrode 1 and a negative electrode 2 overlap each other with a separator 3 interposed therebetween to form an electrode layer 5, and the electrode layer 5 is wound to form an electrode winding body. In the secondary battery, such an electrode winding body is enclosed in an exterior body together with an electrolyte (for example, a non-aqueous electrolyte).

The positive electrode is formed of at least a positive electrode material layer and a positive electrode current collector. In the positive electrode, the positive electrode material layer is provided on at least one side of the positive electrode current collector, and the positive electrode material layer contains a positive electrode active material as an electrode active material. For example, in the positive electrode in the electrode winding body, the positive electrode material layers may be provided on both sides of the positive electrode current collector, or the positive electrode material layer may be provided only on one side of the positive electrode current collector.

The negative electrode is formed of at least a negative electrode material layer and a negative electrode current collector. In the negative electrode, the negative electrode material layer is provided on at least one side of the negative electrode current collector, and the negative electrode material layer contains a negative electrode active material as an electrode active material. For example, in the negative electrode in the electrode winding body, the negative electrode material layers may be provided on both sides of the negative electrode current collector, or the negative electrode material layer may be provided only on one side of the negative electrode current collector.

In addition, the electrode active materials contained in the positive and negative electrodes, that is, the positive electrode active material and the negative electrode active material are substances directly involved in the transfer of electrons in the secondary battery and are main substances of the positive and negative electrodes which are responsible for charging and discharging, namely a battery reaction. More specifically, ions are generated in the electrolyte by the positive electrode active material contained in the positive electrode material layer and the negative electrode active material contained in the negative electrode material layer, and the ions move between the positive electrode and the negative electrode and the electrons are transferred, whereby charging and discharging are performed. The positive electrode material layer and the negative electrode material layer are particularly preferably layers capable of inserting and extracting lithium ions. In other words, preferred is a non-aqueous secondary battery in which lithium ions move between a positive electrode and a negative electrode through a non-aqueous electrolyte, thereby charging and discharging the battery. When lithium ions are involved in charging and discharging, the secondary battery according to the present invention corresponds to a so-called "lithium ion battery", and the positive electrode and the negative electrode have a layer capable of inserting and extracting lithium ions.

The positive electrode active material of the positive electrode material layer is made of, for example, a granular material, and it is preferable that a binder be contained in the positive electrode material layer in order to maintain a more sufficient contact between particles and the shape of the particles. Further, a conductive auxiliary agent may be contained in the positive electrode material layer in order to facilitate transmission of electrons promoting the battery reaction. Similarly, when the negative electrode active material of the negative electrode material layer is made of, for example, a granular material, a binder is preferably contained in order to maintain a more sufficient contact between particles and the shape of the particles, and a conductive auxiliary agent may be contained in the negative electrode material layer in order to facilitate transmission of electrons promoting the battery reaction. As described above, since a plurality of components is contained, the positive electrode material layer and the negative electrode material layer can also be referred to as positive electrode mixture layer and negative electrode mixture layer, respectively.

The positive electrode active material is preferably a material that contributes to insertion and extraction of lithium ions. In this respect, the positive electrode active material is preferably, for example, a lithium-containing composite oxide. More specifically, the positive electrode active material is preferably a lithium-transition metal composite oxide containing lithium and at least one transition metal selected from the group consisting of cobalt, nickel, manganese, and iron. That is, the positive electrode material layer of the secondary battery obtained by the manufacturing method of the present invention preferably contains such a lithium-transition metal composite oxide as a positive electrode active material. Examples of the positive electrode active material may include lithium cobaltate, lithium nickelate, lithium manganate, lithium iron phosphate, or materials in which a part of the transition metal of these is substituted with another metal. Such a positive electrode active material may be contained singly or in combination of two or more. Although it is merely an example, in the secondary battery obtained by the manufacturing method of the present invention, the positive electrode active material contained in the positive electrode material layer may be lithium cobaltate.

Furthermore, the binder which can be contained in the positive electrode material layer is not particularly limited, but examples thereof include at least one selected from the group consisting of polyvinylidene fluoride, a vinylidene fluoride-hexafluoropropylene copolymer, a vinylidene fluoride-tetrafluoroethylene copolymer, polytetrafluoroethylene and the like. The conductive auxiliary agent which can be contained in the positive electrode material layer is not particularly limited, but examples thereof include at least one selected from the group consisting of carbon black such as thermal black, furnace black, channel black, ketjen black, and acetylene black; carbon fibers such as graphite, carbon nanotube, and vapor-grown carbon fiber; metal powders such as copper, nickel, aluminum, and silver; polyphenylene derivatives, and the like. For example, the binder of the positive electrode material layer may be polyvinylidene fluoride, and the conductive auxiliary agent of the positive electrode material layer may be carbon black. Although it is merely an example, the binder and the conductive auxiliary agent of the positive electrode material layer may be a combination of polyvinylidene fluoride and carbon black.

The negative electrode active material is preferably a material that contributes to insertion and extraction of lithium ions. In this respect, the negative electrode active material can be preferably, for example, various carbon materials, oxides or lithium alloys.

Examples of various carbon materials of the negative electrode active material include graphite (natural graphite, artificial graphite), hard carbon, soft carbon, and diamond-like carbon. In particular, graphite is preferable because it has high electron conductivity and excellent adhesive properties to a negative electrode current collector. Examples of the oxide of the negative electrode active material include at least one selected from the group consisting of silicon oxide, tin oxide, indium oxide, zinc oxide, lithium oxide and the like. The lithium alloy of the negative electrode active material may be any metal as long as the metal can be alloyed with lithium, and the lithium alloy may be, for example a binary, ternary or higher alloy of a metal such as Al, Si, Pb, Sn, In, Bi, Ag, Ba, Ca, Hg, Pd, Pt, Te, Zn or La and lithium. It is preferable that such an oxide be amorphous as its structural form. This is because degradation due to nonuniformity such as crystal grain boundaries or defects is hardly caused. Although it is merely an example, in the secondary battery obtained by the manufacturing method of the present disclosure, the negative electrode active material of the negative electrode material layer may be artificial graphite.

The binder which can be contained in the negative electrode material layer is not particularly limited, but examples thereof include at least one kind selected from the group consisting of styrene-butadiene rubber, polyacrylic acid, polyvinylidene fluoride, polyimide-based resin, and polyamideimide-based resin. For example, the binder contained in the negative electrode material layer may be a styrene-butadiene rubber. The conductive auxiliary agent which can be contained in the negative electrode material layer is not particularly limited, but examples thereof include at least one selected from the group consisting of carbon black such as thermal black, furnace black, channel black, ketjen black, and acetylene black; carbon fibers such as graphite, carbon nanotube, and vapor-grown carbon fiber; metal powders such as copper, nickel, aluminum, and silver; polyphenylene derivatives, and the like. It is to be noted that the negative electrode material layer may contain a component caused by a thickener component (for example, carboxymethyl cellulose) used at the time of manufacturing the battery.

Although it is merely an example, the negative electrode active material and the binder in the negative electrode material layer may be a combination of artificial graphite and styrene-butadiene rubber.

The positive electrode current collector and the negative electrode current collector used for the positive electrode and the negative electrode are members that contribute to the collection and supply of electrons generated in the active material by the battery reaction. Such a current collector can be a sheet-like metal member and may be in a porous or perforated form. For example, each of the current collectors can be a metal foil, a punching metal, a net, an expanded metal, or the like. The positive electrode current collector used for the positive electrode is preferably made of a metal foil containing at least one selected from the group consisting of aluminum, stainless steel, nickel and the like, and may be, for example, an aluminum foil. On the other hand, the negative electrode current collector used for the negative electrode is preferably made of a metal foil containing at least one selected from the group consisting of copper, stainless steel, nickel and the like, and may be, for example, a copper foil.

The separator used for the positive electrode and the negative electrode is a member provided from the viewpoints of the prevention of short circuit due to contact between the positive and negative electrodes and the holding of the electrolyte and the like. In other words, the separator is a member configured to pass ions while preventing electronic contact between the positive electrode and the negative electrode. Preferably, the separator is a porous or microporous insulating member and has a film form due to its small thickness. Although it is merely an example, a microporous membrane made of polyolefin may be used as the separator. In this respect, the microporous membrane used as the separator may contain, for example, only polyethylene (PE) or only polyethylene (PP) as polyolefin Further, the separator may be a laminate including a microporous membrane made of PE and a microporous membrane made of PP. The surface of the separator can be covered with an inorganic particle coating layer, an adhesive layer, or the like. The surface of the separator may have adhesive properties. In the exemplary embodiment of the present disclosure, the separator should not be particularly restricted by its name, and may be a solid electrolyte, a gel-like electrolyte, an insulating inorganic particle, or the like that has a similar function.

In the exemplary secondary battery according to the present disclosure, an electrode winding body composed of an electrode layer including at least a positive electrode, a negative electrode, and a separator is enclosed in an exterior body together with an electrolyte. When the positive electrode and the negative electrode have a layer configured for inserting and extracting lithium ions, the electrolyte is preferably a "nonaqueous" electrolyte such as an organic electrolyte and an organic solvent (that is, that the electrolyte preferably serves as a nonaqueous electrolyte). In the electrolyte, metal ions released from the electrode (positive electrode/negative electrode) will be present, and the electrolyte will thus help the movement of the metal ions in the battery reaction.

The nonaqueous electrolyte is an electrolyte containing a solvent and a solute. As a specific solvent for the nonaqueous electrolyte, a solvent containing at least a carbonate is preferred. The carbonates may be cyclic carbonates and/or chain carbonates. Although not particularly limited, examples of the cyclic carbonates include at least one kind selected from the group consisting of propylene carbonate (PC), ethylene carbonate (EC), butylene carbonate (BC), and vinylene carbonate (VC). Examples of the chain carbonates include at least one kind selected from the group consisting of dimethyl carbonate (DMC), diethyl carbonate (DEC), ethyl methyl carbonate (EMC), and dipropyl carbonate (DPC). Although it is merely an example, a combination of cyclic carbonate and chain carbonate may be used as the nonaqueous electrolyte, and, for example, a mixture of ethylene carbonate and diethyl carbonate is used. As a solute of a specific nonaqueous electrolyte, for example, an Li salt such as $LiPF_6$ and/or $LiBF_4$ is preferably used.

According to an exemplary aspect, the exterior body of the secondary battery is intended to wrap the electrode winding body in which the electrode layer including the positive electrode, the negative electrode, and the separator is stacked, and may be a hard or soft case. Specifically, the exterior body can have a hard case type corresponding to a so-called "metal can", or may have a soft case type corresponding to a "pouch" formed from a so-called laminate film.

[Exemplary Manufacturing Method]

The exemplary manufacturing method of the present disclosure is provided for manufacturing the battery with a unique shape, and the manufacturing method applied to a battery precursor and a precursor thereof. In particular, exemplary embodiment of the present disclosure is characterized by an electrode precursor laminate and its winding method in view of a specific battery shape and an external terminal of the battery.

Figure 2:
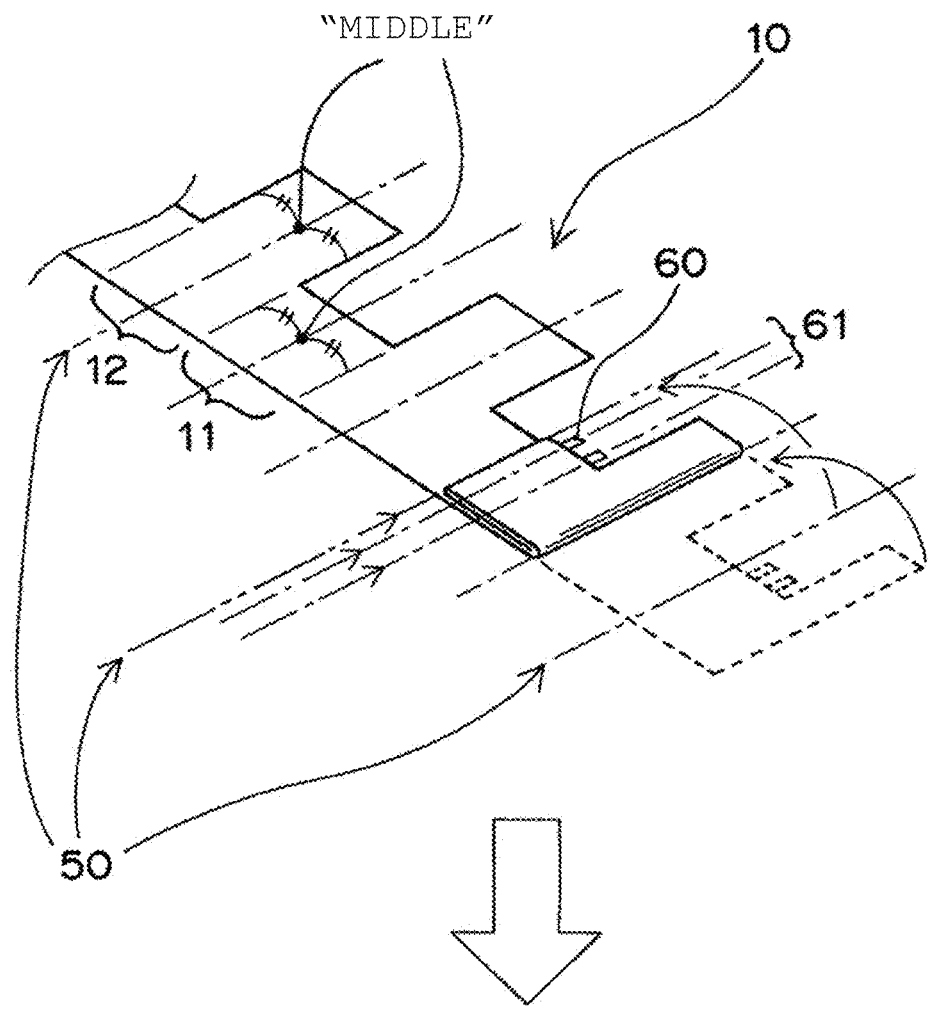
FIG. 2 is a schematic view showing a process aspect in a manufacturing method according to one exemplary embodiment.
Figure 2:
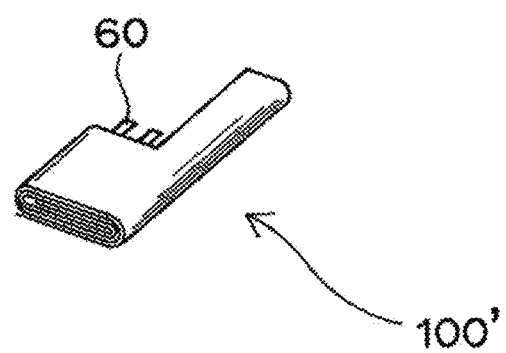

Specifically, the exemplary manufacturing method of the present disclosure provides for manufacturing a secondary battery having a non-rectangular overall shape in planar view, and in this manufacturing method, the electrode precursor laminate to be a battery precursor is wound to obtain a non-rectangular secondary battery. Specifically, the secondary battery comprises an electrode winding body that includes a positive electrode and a negative electrode, and has a non-rectangular shape in planar view, and while a positive electrode precursor and a negative electrode precursor are stacked on each other using a separator to form an electrode precursor laminate, the electrode precursor laminate is wound to form the electrode winding body. In particular, in the manufacturing method of the present disclosure, as shown in FIG. 2, an electrode precursor laminate 10 has a comb-teeth shape in planar view, and winding is performed such that a winding axis 50 for winding is substantially parallel to an extending direction 61 of a terminal element 60 of a secondary battery, whereby a planar view shape of an electrode winding body 100' is made non-rectangular. That is, the comb-teeth-shaped electrode precursor laminate 10 is wound such that the planar view shape of the electrode winding body 100' is non-rectangular.

In the exemplary manufacturing method, the winding contributes to the non-rectangular shape of the secondary battery, and hence the electrode precursor laminate 10 before winding at least has the comb-teeth shape. Because of the comb-teeth shape, the planar view shape of the electrode precursor laminate 10 has a narrow portion 11 and a wide portion 12. While the term "narrow portion" used herein means a local portion of an electrode precursor laminate in which the width dimension is relatively reduced in planar view, the term wide portion means a local portion of an electrode precursor laminate in which the width dimension is relatively increased in planar view (i.e., the term width dimension used here substantially means a dimension in a direction orthogonal to the dimension of the electrode precursor laminate gradually reduced due to the winding, as can be seen from the aspect of the planar view shown). That is, the electrode precursor laminate 10 has a configuration in which the width dimension is not constant and is locally reduced or increased. Preferably, a plurality of narrow portions and wide portions are provided, and the narrow portions and the wide portions are alternately continued. In an exemplary embodiment, a plurality of such narrow portions have substantially the same shape and size as each other, and a plurality of wide portions also have substantially the same shape and size as each other. In other words, it may be preferable that the width dimension of the electrode precursor laminate 10 be periodically reduced or increased (more specifically, it is preferable that the width dimension of the electrode precursor laminate be periodically reduced or increased as viewed along the direction of the electrode precursor laminate whose dimension is gradually reduced due to winding). It is noted that in the present disclosure, a desired non-rectangular shape can be obtained by suitably winding the electrode precursor laminate 10 having such a comb-teeth shape.

For example, as shown in FIG. 2, when winding is performed such that the middle of each of the narrow portion and the wide portion in the comb-teeth shape is a location of bending in the winding, the non-rectangular shape can be obtained more suitably. That is, in an exemplary embodiment, winding is performed such that a central line of the narrow portion and a central line of the wide portion of the electrode precursor laminate 10 (or the vicinity of the lines) correspond to bending lines for winding to obtain the non-rectangular electrode winding body 100'.

In a broad sense, the term "middle" used in connection with bending in the winding refers to "middle" in a case where each of the narrow portion and the wide portion is captured in a direction orthogonal to a width direction in planar view. In a narrow sense, the term "middle" refers to a point substantially at the center of the narrow portion and the wide portion in such a direction orthogonal to the width direction. Here, in the exemplary embodiment of the present disclosure, the term "middle" does not necessarily mean strict "middle", and it suffices that a portion which is particularly greatly bent during winding is located substantially halfway between each of the narrow portion and the wide portion. For example, assuming that the dimensions of the narrow portion and the wide portion in the direction orthogonal to the width direction are $L_1$ and $L_2$, respectively, a middle point of the narrow portion may be a point that is "$L_1/2$ to $L_1/2 \pm 0.3 \times L_1$", preferably "$L_1/2$ to $L_1/2 \pm 0.2 \times L_1$" in the direction orthogonal to the width direction starting from an edge of the narrow portion. Similarly, a midpoint of the wide portion may be a point that is "$L_2/2$ to $L_2/2 \pm 0.3 \times L_2$", preferably "$L_2/2$ to $L_2/2 \pm 0.2 \times L_2$" in the direction orthogonal to the width direction starting from an edge of the wide portion. In view of the exemplary manufacturing method, it suffices that a point where the curvature in cross-sectional view is the largest corresponds to the above-mentioned "middle" of the narrow portion and the wide portion.

Figure 3:
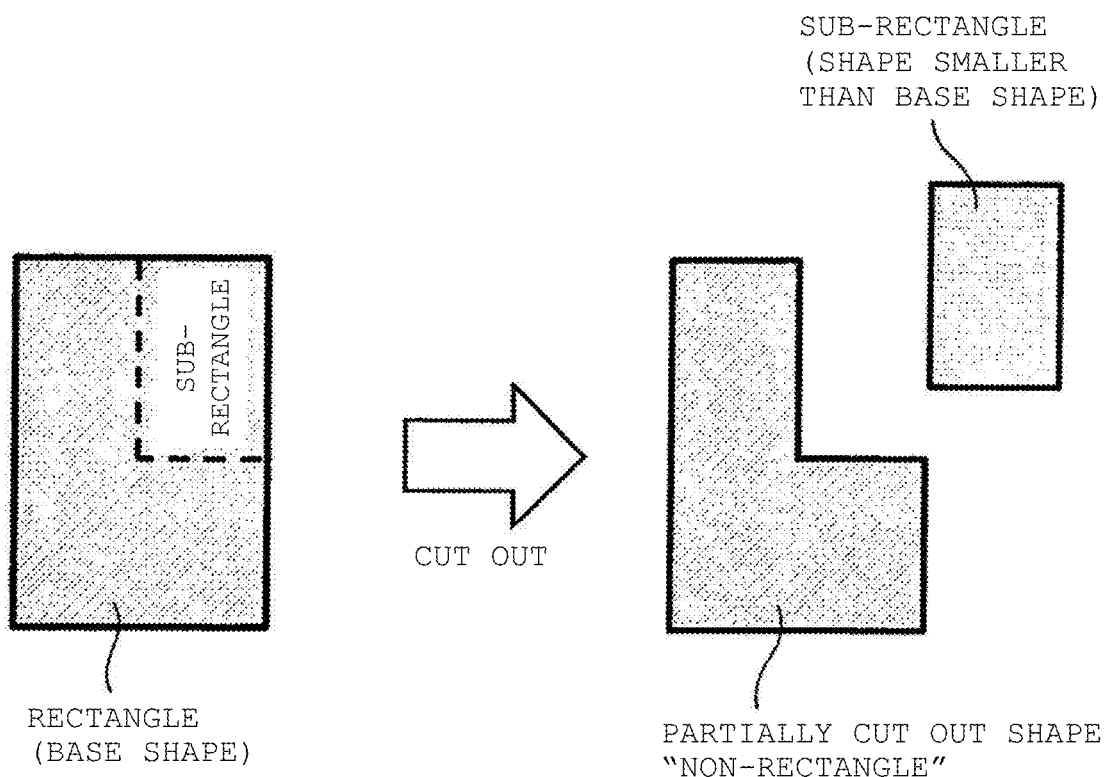
FIG. 3 is a schematic view for explaining a "non-rectangle".

In the exemplary embodiment of the present disclosure, although a non-rectangular secondary battery is obtained, the terms "non-rectangular" and "non-rectangle" used herein refer to a shape in which an electrode shape in planar view is not usually included in a rectangular concept such as a square and rectangle, and in particular, the terms "non-rectangular" and "non-rectangle" refer to a shape obtained by partially removing such a square or rectangle. Thus, in a broad sense, the term "non-rectangular" or "non-rectangle" refers to the shape that the electrode shape in planar view seen from an upper side in a thickness direction is not square or rectangle, and in a narrow sense, the term "non-rectangular" or "non-rectangle" refers to that the electrode shape in planar view is a shape obtained by partially cutting out a square or rectangle (preferably, a shape obtained by cutting out a corner portion of the square or rectangle as a base) even though the electrode shape in planar view is based on the square or rectangle. Although the followings are merely examples, when the electrode shape in planar view is based on a square or rectangle, the non-rectangle shape can be a shape obtained by cutting out, from the base shape, square, rectangle, semi-circle, semi-ellipse, a portion of circle or ellipse, or a combination of these shapes, which are smaller in planar view size than the base shape (in particular, a shape obtained by cutting out from the corner portion of the base shape) (see FIG. 3). The exemplary embodiment shown in FIG. 3 exemplifies a non-rectangle shape obtained by cutting out, from a corner portion of a rectangular or square base shape, a sub-rectangle or sub-square smaller than the base shape.

According to the exemplary manufacturing method of the present disclosure, the electrode precursor laminate is wound such that the winding axis is substantially parallel to the extending direction of the terminal element of the secondary battery. That is, it is preferable that a direction in which the electrode precursor laminate is wound (that is, a direction in which the dimension of the electrode precursor laminate is gradually reduced by winding) be substantially orthogonal to the extending direction of the terminal element. It is noted that the terms "substantially parallel" and "substantially vertical" used herein each include tolerances recognized as substantially parallel and substantially vertical by those skilled in the art (that is, the terms "substantially parallel" and "substantially vertical" may not be completely "parallel" and "vertical" but include embodiments slightly deviated from them). For example, "substantially parallel" includes the range from perfect parallel to ±20°, for example, ±10°, and similarly, "substantially vertical" includes the range from perfect vertical to ±20°, for example, ±10°. As can be seen from the embodiment shown in FIG. 2, the winding axis according to the present disclosure may be regarded as the bending line, folding line or the like of the electrode precursor laminate at the time of winding.

In the exemplary manufacturing method of the present disclosure, as described above, the extending direction of the terminal element and the winding axis correspond to each other in the exemplary aspect. Moreover, the term "terminal element" in a broad sense means a battery portion and a battery member to be used for electrical connection with the outside, and in a narrow sense includes so-called external terminals of a battery and means a battery connection member such as lead and/or collector tab to be used for connection (especially electrical connection) between the external terminal and the electrode winding body. When the lead and/or the collector tab is used as a terminal element of a secondary battery (for example, when winding is performed with the lead attached to the electrode precursor laminate), the electrode precursor laminate is wound under the condition of the winding axis substantially parallel to the extending direction of the lead. Such winding of the electrode precursor laminate contributes to a suitable proximal arrangement between a substrate (for example, an electronic circuit board represented by a printed circuit board, a protective circuit board and the like) and a battery external terminal.

In an exemplary aspect, the electrode precursor laminate 10 to be wound by the manufacturing method preferably has a band-like, elongated shape as a whole. Moreover, the winding is preferably performed so as to fold a strip-like electrode precursor laminate which extends relatively long in one direction, and it is preferable that the winding axis for the winding is made substantially parallel to the extending direction of the terminal element of the secondary battery. That is, in a preferred embodiment, the electrode precursor laminate has an elongated shape, and the longitudinal direction of the elongated shape and the extending direction of the terminal element are substantially orthogonal to each other. This provides a method of manufacturing a non-rectangular secondary battery that is configured in terms of installation of the external terminal. It is noted that the term "substantially orthogonal" used herein includes tolerances recognized as roughly orthogonal by those skilled in the art, and includes, for example, the range from perfect orthogonality to ±20°, for example, ±10°.

Figure 4A:
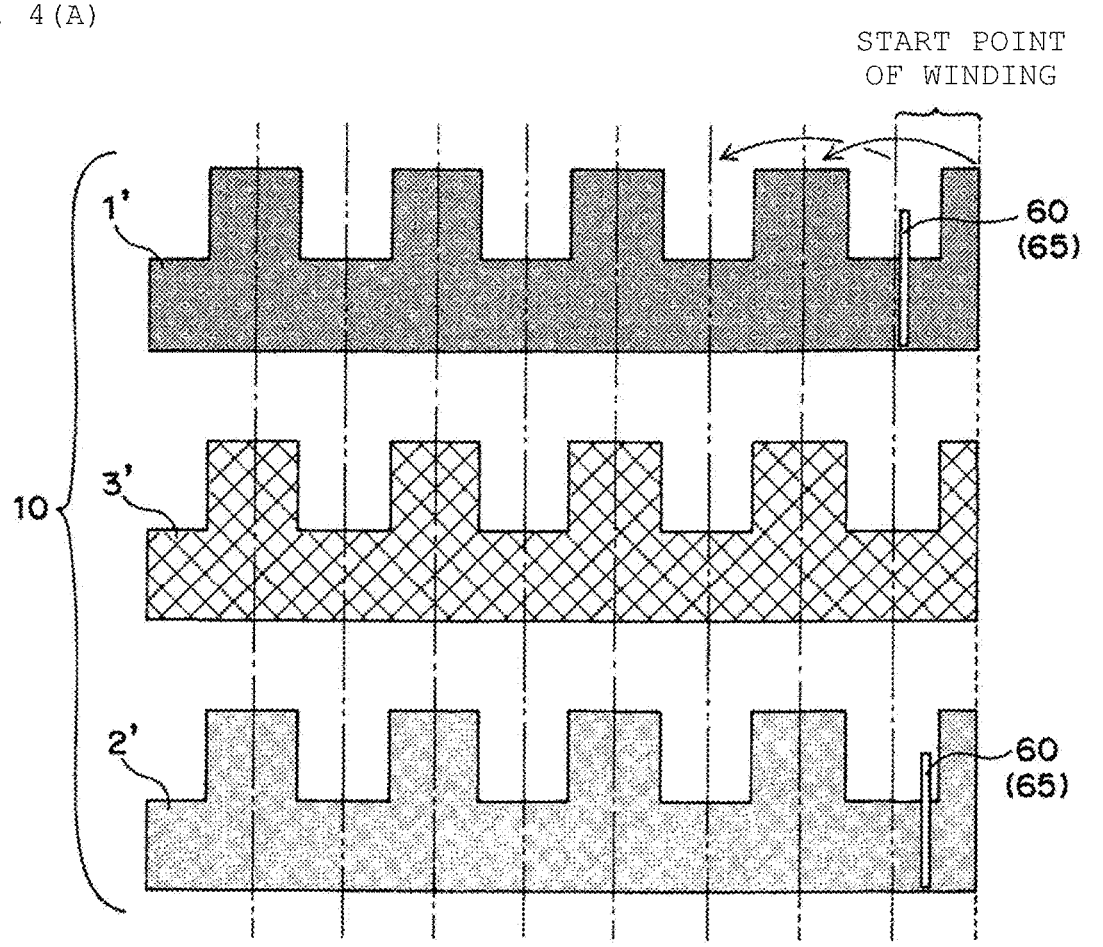
FIGS. 4A and 4B are schematic plan views for explaining an electrode precursor laminate (FIG. 4A: electrode precursor laminate relatively small in length, FIG. 4B: electrode precursor laminate relatively large in length).
Figure 4B:
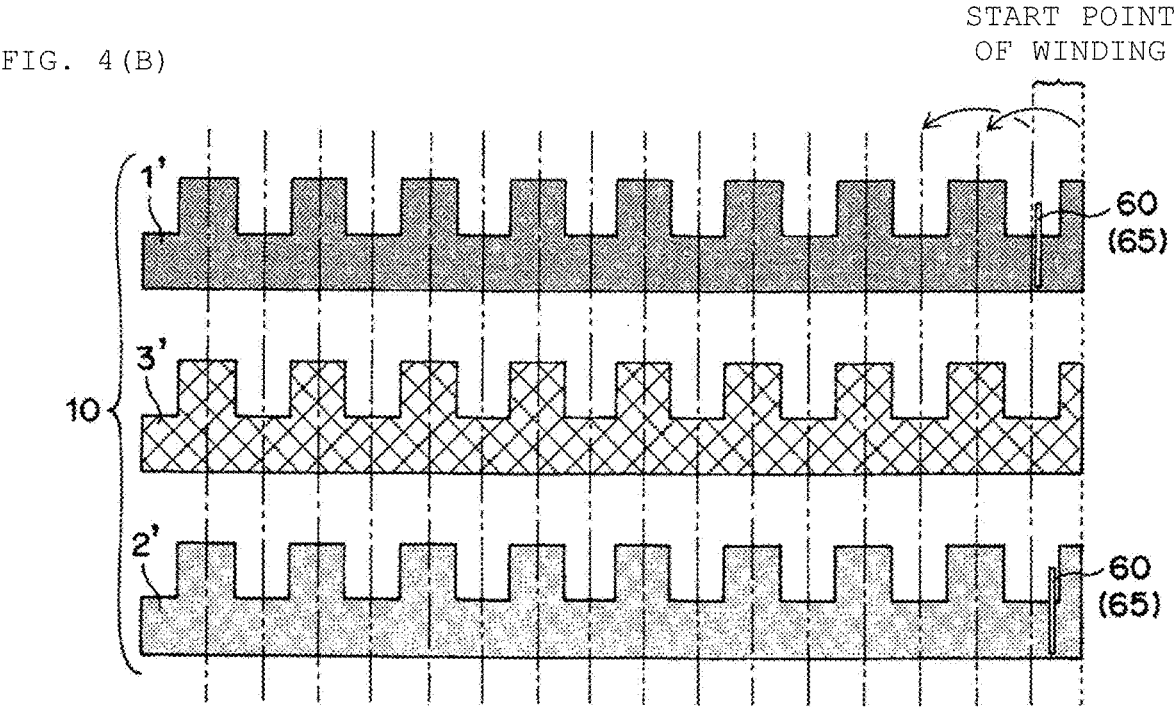

The electrode precursor laminate 10 itself is at least formed of a positive electrode precursor 1', a negative electrode precursor 2', and a separator 3' (see FIGS. 4(A) and 4(B)), which are stacked on each other. The positive electrode precursor 1' substantially corresponds to the positive electrode as described above and is therefore formed of the positive electrode material layer and the positive electrode current collector as described above. Similarly, the negative electrode precursor 2' substantially corresponds to the negative electrode described above and is therefore formed of the negative electrode material layer and the negative electrode current collector as described above. Here, in the exemplary manufacturing method of the present disclosure, the electrode precursor laminate 10 is obtained by stacking the positive electrode precursor 1' and the negative electrode precursor 2' on each other with at least the separator 3' interposed therebetween. In an exemplary aspect, pressing can be performed to further stabilize the stacked state. In the exemplary embodiment, the electrode precursor laminate has a comb-teeth shape, and it is preferable that those components have macroscopically the same or similar shape. That is, in an exemplary embodiment, the positive electrode precursor 1', the negative electrode precursor 2' and the separator 3' each have a comb-teeth shape (see FIGS. 4(A and 4(B)), and in the formation of the electrode precursor laminate, the narrow and wide portions of the comb-teeth shape are substantially aligned with each other between the positive electrode precursor, the negative electrode precursor and the separator. Consequently, the electrode precursor laminate to be wound can be suitably obtained.

In an exemplary embodiment, the overall three-dimensional shape of the electrode winding body is flattened. For example, the electrode precursor laminate can be wound so as to be folded, whereby the three-dimensional shape of the appearance of the electrode winding body may be flattened. Preferably, the winding is performed such that the middle of each of the narrow portion and the wide portion in the comb-teeth shape of the electrode precursor laminate is bent. Consequently, the non-rectangular secondary battery can be more suitably obtained while flattening the overall three-dimensional shape. It is noted that the term folding/bending used herein means a winding mode in which the electrode precursor laminates are significantly bent so as to be stacked on one another, rather than specifically means such a winding in which a fold is clearly formed. Moreover, the term flat used herein preferably means that at least the thickness dimension in the secondary battery is smaller than the other dimensions (in particular, a dimension forming a shape in planar view) and simply means that the overall external shape of the battery is plate-like or thin plate-like shape.

In the exemplary manufacturing method of the present disclosure, it is preferable to wind the electrode precursor laminate such that a region of the terminal element corresponds to a winding start point. More specifically, as shown in FIGS. 2 and 4(A) and 4(B), it is preferable to perform winding such that an end of the electrode precursor laminate 10 where the terminal element 60 is positioned becomes the winding start point. This substantially means that an end of the electrode precursor laminate is positioned as an external terminal portion and the electrode precursor laminate is wound from the external terminal portion thus positioned. That is, it can be said that winding is performed such that the terminal element is located at the end of the electrode precursor laminate and the end becomes the winding start point. Consequently, in the secondary battery finally obtained, it is possible to suitably obtain a winding structure in which the terminal element of the secondary battery extends from the region of the winding start point. Thus, in the electrode winding body of the secondary battery, the external terminal is provided at a central or center portion of the winding body (based on cross-sectional view), and suitable heat dissipation is achieved via the external terminal.

The preferable heat dissipation characteristics that can be exhibited by the exemplary embodiment will be described in detail. The terminal elements including the external terminal of the battery and the like generally have high heat transfer properties, and heat generated by the secondary battery can be dissipated to the outside. That is, the terminal elements including the external terminal and the like can contribute to formation of a heat dissipation path when the battery is used. Here, when the terminal element is provided at the central or center portion of the winding body, in particular as viewed in a cross-sectional view, the terminal element is positioned at a substantially equal distance from any portion (in short, any heat generation region of the battery) of an internal region of the battery. As described above, when the terminal element is positioned at an even distance, a bias in battery heat dissipation may be reduced, resulting in more efficient heat dissipation. That is, by providing the external terminals at the central or center portion of the inside of the winding body of the secondary battery, a heat dissipation path for dissipating heat to the outside is more preferably formed.

A preferred winding structure in terms of such heat dissipation corresponds to a winding structure in which a portion to be bent first in the electrode precursor laminate serves as the region of the terminal element. Although the electrode precursor laminate to be wound may be provided with the positive electrode precursor or the negative electrode precursor on the outside, in the winding, one of the electrode precursors can be located inside the winding relative to the other electrode precursor. That is, the positive electrode precursor can be wound so as to be folded or bent while being relatively inside, or the negative electrode precursor may be wound so as to be folded or bent while being relatively inside.

In the exemplary manufacturing method of the present disclosure, after an electrode winding body is obtained, the electrode winding body is enclosed in an exterior body together with an electrolyte. Thereby, a desired secondary battery can be obtained. That is, a battery exterior body such as a so-called "metal can" of a hard case type or a "pouch" formed from a so-called laminate film of a soft case type is used to wrap the electrode winding body, and a desired secondary battery can be obtained by injecting and sealing an electrolyte into the inside of the battery exterior body (the terminal element can be appropriately treated to provide the external terminal of the battery).

The exemplary manufacturing method of the present invention can be embodied in various manners. The details will be described below.

In the exemplary manufacturing method of the present disclosure, in the electrode precursor laminate, a portion directly connected to an electrode external terminal can be provided at any place. That is, the terminal element can be provided at any place in the electrode precursor laminate. Thus, the terminal element can be provided at any of the narrow portions with respect to the comb-teeth shape, or the terminal element can be provided at any of the wide portions. Since one external terminal for the electrode is sufficient for each of the positive electrode and the negative electrode, a terminal element for the positive electrode can be provided anywhere of the positive electrode precursor of the electrode precursor laminate, and the terminal element for the negative electrode can be also provided anywhere of the negative electrode precursor of the electrode precursor laminate.

However, in view of more suitably positioning the external terminal in the non-rectangular secondary battery, the terminal element is preferably disposed at the narrow portion of the laminate. That is, as shown in FIGS. 2 and 4(A) and 4(B), the terminal element is preferably disposed at the narrow portion of the comb-tooth shape in the electrode precursor laminate. When the terminal element is provided at the narrow portion of the comb-teeth shape, the external terminal can be positioned in a state of being close to a battery cutout portion in the finally obtained secondary battery. In other words, installing the terminal element in the narrow portion leads to providing the external terminal on a battery side surface of the battery cutout portion forming a non-rectangle (that is, the external terminal extends or protrudes from the battery side surface contributing to shaping of the battery cutout portion). In particular, by positioning the terminal element at the narrow portion so as to obtain a condition that the extending direction of the terminal element and the winding axis for the winding are substantially parallel to each other, the external terminal can be suitably positioned with respect to the battery side surface of the battery cutout portion forming a non-rectangle.

In the exemplary manufacturing method of the present disclosure, a lead can be included as a terminal element. That is, the electrode precursor laminate can be provided with a conductive lead as a battery constituent member contributing to electrical connection to the outside of the battery, and winding can be performed such that a winding axis is substantially parallel to an extending direction of the lead. For example, the lead can be provided to the narrow portion of the electrode precursor laminate. When the electrode precursor laminate has an elongated shape, the lead may be provided substantially orthogonal to the longitudinal direction of the elongated shape.

It is noted that the term "lead" used herein in a broad sense means a battery member to be subjected to electrical connection, and in a narrow sense means a battery member to be subjected to electrical connection between the external terminal of the battery and the electrode precursor laminate/electrode assembly. The lead is a member having conductivity, for example, made of metal, and preferably has a thin-walled form and/or an elongated form (that is, preferably, the lead is provided such that the longitudinal direction of the elongated shape of the electrode precursor laminate and the longitudinal direction of the elongated form of the lead are substantially orthogonal to each other in planar view). The lead itself may be always used in secondary batteries (for example, lithium secondary batteries).

Preferably, the lead is positioned at the winding start point. That is, in an exemplary embodiment of the present disclosure, a lead is included as a terminal element, and the lead is provided at the end of the electrode precursor laminate. Thus, in the finally obtained secondary battery, the lead and the external terminal electrically connected to the lead suitably extend from the region of the winding start point in the winding structure. That is, in the electrode winding body of the secondary battery, the external terminal is provided at the central or center portion of the winding body (based on cross-sectional view), and heat dissipation characteristics is more suitably achieved via the external terminal.

Figure 5:
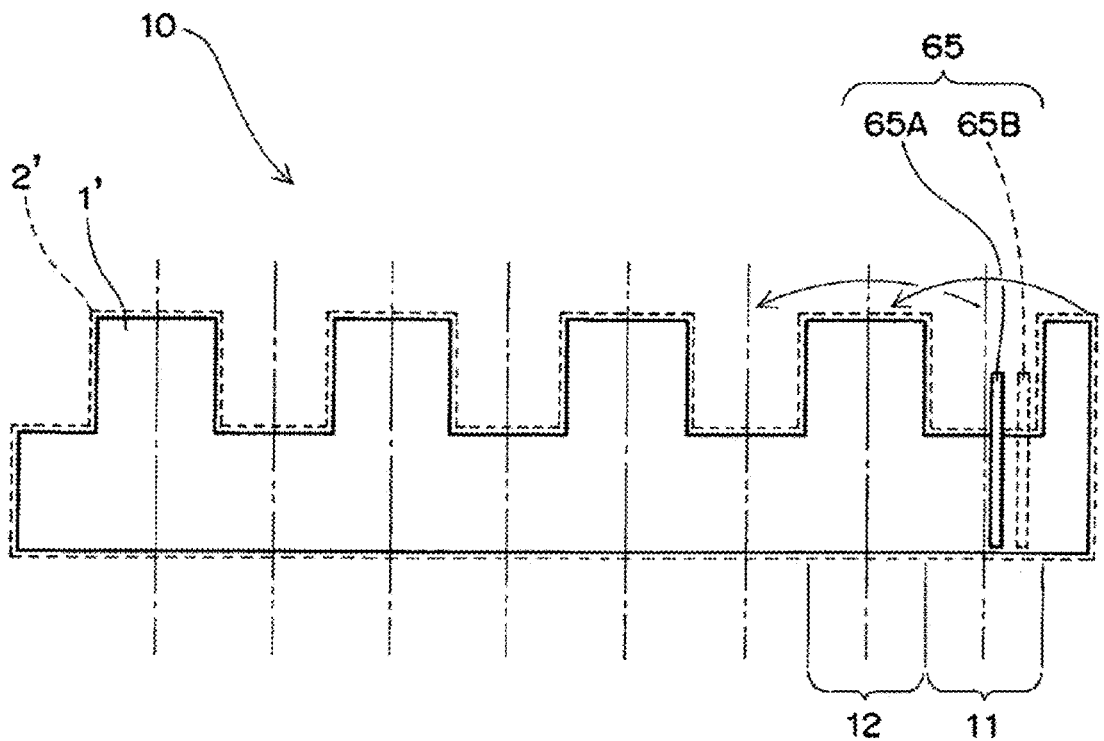
FIG. 5 is a schematic view for explaining a positional relationship between a positive electrode lead and a negative electrode lead in the electrode precursor laminate.

As the lead, a positive electrode lead for the positive electrode and a negative electrode lead for the negative electrode may be used. In the exemplary manufacturing method of the present disclosure, the positive electrode lead and the negative electrode lead can have a positional relationship configured for the non-rectangular secondary battery. Specifically, as shown in FIG. 5, it is preferable to have a positional relationship in which, in the electrode precursor laminate 10, a positive electrode lead 65A and a negative electrode lead 65B do not face each other in the stacking direction of the electrode precursor laminate 10 and are adjacent to each other (or arranged side-by-side) in planar view of the electrode precursor laminate 10. Consequently, in the finally obtained secondary battery, the external terminals of the positive electrode and the negative electrode can be made adjacent to each other, and the external terminals can be positioned substantially at one place. For example, as shown in FIG. 5, although the positive electrode lead 65A and the negative electrode lead 65B do not face each other in the stacking direction of the electrode precursor laminate 10 (although these leads do not overlap each other), the leads may be provided adjacent to each other in the narrow portion 11 having a comb-teeth shape. In this case, the external terminals of the positive electrode and the negative electrode can be collectively localized when close to the battery cutout portion in the finally manufactured secondary battery according to the exemplary embodiment. In particular, the respective external terminals of the positive electrode and the negative electrode can be provided adjacent to each other on the same surface of the secondary battery, and more specifically, the external terminals of the positive electrode and the negative electrode can be made adjacent to each other on the battery side surface of the battery cutout portion forming a non-rectangle.

Figure 6:
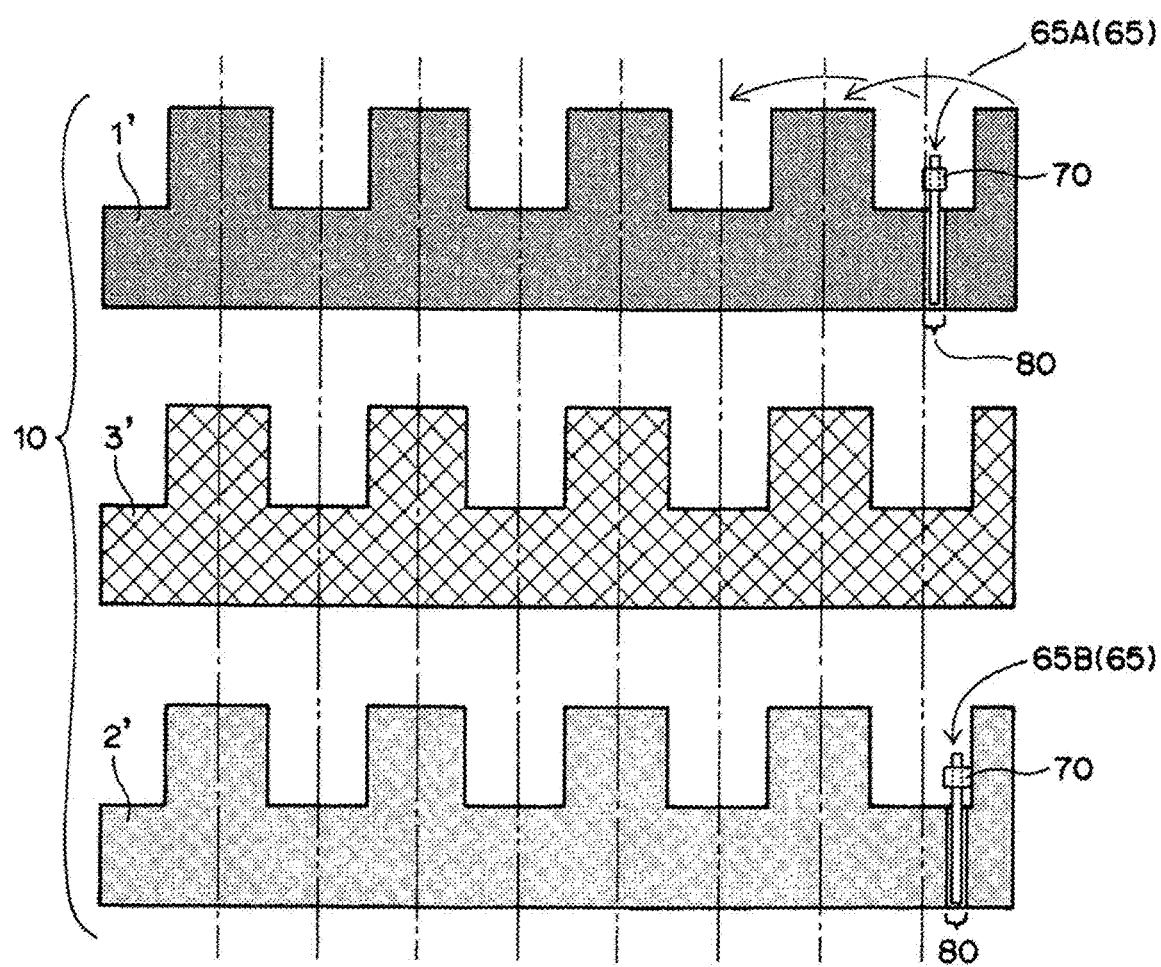
FIG. 6 is a schematic plan view of the electrode precursor laminate, illustrating a "sealant material" and an "inactive material area".

When the lead is included as a terminal element in the manufacturing method of the present disclosure, a sealant can be provided for the lead. That is, the lead may be previously provided with a sealant material for sealing with the exterior body. For example, as shown in FIG. 6, the electrode precursor laminate 10 may be provided with a lead 65 including a sealant 70. Consequently, desired battery manufacture can be performed with an eye on sealing operation with the exterior body (in particular, a "pouch" formed from a so-called laminate film of a soft case type).

In the exemplary manufacturing method of the present disclosure, the lead is preferably provided in the electrode precursor laminate, but in particular may be provided for the electrode material layer or may be provided for the current collector. When heat dissipation property of the battery is particularly important, it is preferable that the current collector be directly provided with the lead. Specifically, it is preferable that the positive electrode current collector be directly provided with the positive electrode lead and the negative electrode current collector be directly provided with the negative electrode lead. This is because electrical resistance in the heat dissipation path for dissipating heat to the outside is reduced, and more efficient heat dissipation characteristics are provided.

For example, a local region not provided with an active material (that is, "positive electrode active material" and/or "negative electrode active material") can be formed in the electrode current collector, and the lead may be connected to the local region. That is, the electrode active material is not locally provided to the electrode current collector in at least one of the positive electrode precursor 1' and/or the negative electrode precursor 2' to form an inactive material area 80, and the lead 65 (the positive electrode lead 65A and the negative electrode lead 65B) may be connected to the inactive material area 80 (see FIG. 6). As a result, a more effective heat dissipation path through the inactive material area 80 is formed when the battery is used, and a secondary battery with more excellent heat dissipation characteristics can be obtained.

Next, an exemplary embodiment of the secondary battery of the present disclosure will be described. As described herein the secondary battery corresponds to the battery manufactured by the above-mentioned manufacturing method. Thus, the exemplary secondary battery is characterized by a unique electrode winding structure related to a unique battery shape and the installation position of the external terminal.

Figure 7:
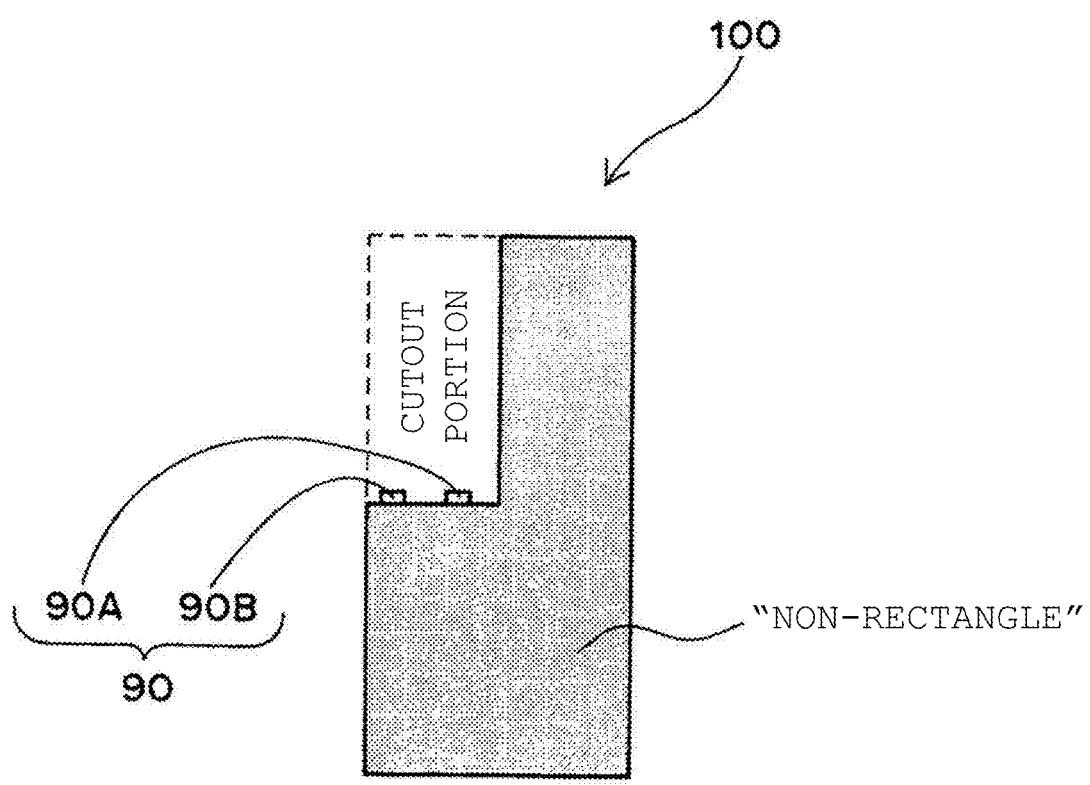
FIG. 7 is a schematic plan view of a secondary battery according to one exemplary embodiment.
Figure 8:
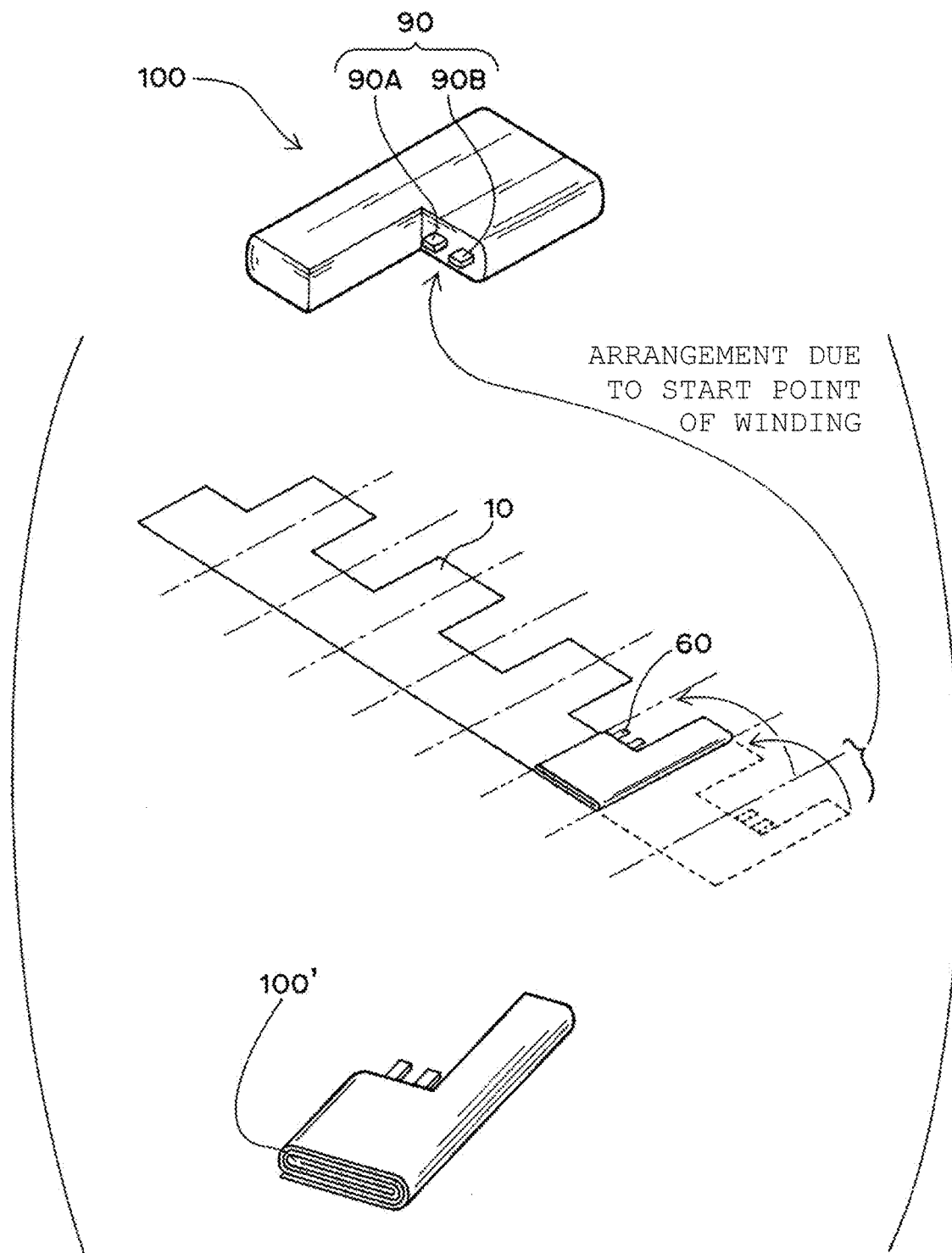
FIG. 8 is a schematic view for explaining a secondary battery according to one exemplary embodiment.

The secondary battery 100 of the present disclosure includes the electrode winding body 100' formed of the positive electrode, the negative electrode, and the separator between the positive electrode and the negative electrode, and the exterior body that wraps the electrode winding body 100', and the planar view shape of the battery is a non-rectangle (see FIGS. 7 and 8). That is, in the secondary battery of the present invention, the electrode laminate has a winding structure, and the battery has a non-rectangular external shape. In other words, due to the non-rectangle, the secondary battery has a battery cutout portion as the external shape.

The electrode winding body in the secondary battery of the present disclosure has the winding structure in which the positive electrode, the negative electrode and the separator are integrally wound, and is characterized in that the extending direction of the terminal element of the secondary battery is substantially parallel to the winding axis of the winding structure. That is, the lead and the external terminal electrically connected to the lead are substantially parallel to a substantial winding axis of the electrode winding structure. Such a configuration contributes to improvement of the heat dissipation characteristics of the battery (heat dissipation through the external terminal) as described above.

As shown in FIG. 8, the overall three-dimensional shape of the secondary battery 100 of the present disclosure is flat. That is, the external shape of the secondary battery is a plate-like or thin plate-like shape. Such a flat shape is at least suitable for confined battery installation space in a housing of a mobile device or the like. In the case of a flat shape, in the winding in the electrode winding body, an electrode layer (layer including a positive electrode, a negative electrode and a separator) is preferably folded. That is, the electrode winding body obtained due to folding of the electrode precursor laminate has a flat shape.

In an exemplary embodiment, the terminal element extends from the region of the winding start point of the winding structure. That is, the terminal element is provided in a region corresponding to a starting point of winding. For example, a lead contributing to connection between the external terminal and the electrode winding body is provided at the winding start point or in the region near the winding start point, and hence the external terminal is positioned at the winding start point of the electrode winding body or in the region near the winding start point. This aspect originates in the manufacturing method of the present invention described above, and further originates in the fact that winding has been performed such that the end of the electrode precursor laminate where the terminal element is positioned becomes the winding start point. In this aspect, in the electrode winding body of the secondary battery, the external terminal is provided at the central or center portion of the winding body (based on cross-sectional view), and when the battery is used, more effective heat dissipation can be performed via the external terminal.

In an exemplary embodiment, the terminal element is positioned at an intermediate level of the thickness of the secondary battery due to provision of the terminal element in the region corresponding to the starting point of winding. For example, a lead is provided to the electrode winding body at a place corresponding to substantially the middle of the thickness of the electrode winding body, and hence the external terminal is positioned at a place corresponding to substantially the middle of the thickness of the secondary battery. Such positioning at the intermediate level means that, particularly in cross-sectional view, the terminal element or the external terminal is positioned at a substantially equal distance from any portion (in short, any heat generation region of the battery) of the internal region of the battery. Thus, a bias in battery heat dissipation may be reduced, and more efficient heat dissipation characteristics may be exhibited.

It is noted that the term "intermediate level" used herein corresponds to a central point in the thickness direction of the battery or the electrode winding body in cross-sectional view. Moreover, the term "intermediate level" does not necessarily mean strict "central point" but includes the range slightly deviated therefrom. For example, assuming that the thickness dimension of the battery or the electrode winding body is "T", the intermediate level may be a level that is "T/2 to T/2±0.3×T", preferably "T/2 to T/2±0.2×T", more preferably "T/2 to T/2±0.1×T" in the thickness direction starting from a main surface on the bottom side of the battery.

The electrode winding body in the secondary battery is obtained by winding the electrode precursor laminate to the last. Thus, each of the positive electrode, the negative electrode and the separator used in the electrode winding body has a comb-teeth shape in a non-wound state. This means that each of the positive electrode, the negative electrode, and the separator used in the electrode winding body has the narrow portion and the wide portion in the non-wound state (planar view). In other words, each of the positive electrode, the negative electrode, and the separator used in the electrode winding body is not constant in its width dimension in the non-wound state, and the width dimension is locally reduced or increased. Since the electrode winding body is obtained by winding the electrode precursor laminate, the electrode winding body of the battery has a structure (continuous structure) in which there is substantially no joint in a planar direction orthogonal to the thickness direction. That is, although the secondary battery of the exemplary embodiment has a unique shape in which the electrode winding body has a non-rectangular shape, the battery has a totally seamless structure, that is, a continuous structure.

In an exemplary embodiment, external terminals 90 (an external terminal 90A on the positive electrode side and an external terminal 90B on the negative electrode side) of the positive electrode and the negative electrode are provided adjacent to each other on the same surface of the secondary battery. That is, in the secondary battery, preferably the external terminal is positioned in substantially one place. This aspect originates in arrangement of the leads in the electrode precursor laminate in the manufacturing method of the present invention. Specifically, the aspect originates in the fact that in the electrode precursor laminate, there is a positional relationship in which the positive electrode lead 65A and the negative electrode lead 65B do not face each other in the stacking direction of the electrode precursor laminate 10 and are adjacent to each other in planar view of the electrode precursor laminate 10 (see FIG. 5). Thus, when the external terminals are provided adjacent to each other on the same surface of the battery, a preferred battery design for a non-rectangular secondary battery is provided. For example, as shown in FIGS. 7 and 8, the external terminal 90 of the battery can be more suitably positioned at a cutout portion (more precisely, a battery surface forming the cutout portion) in the non-rectangular secondary battery 100. In particular, the external terminal can be positioned in proximity to the battery cutout portion forming a non-rectangular shape. In planar view, the terminal element can extend from a battery side surface shaping the battery cutout portion at the battery cutout portion provided by the non-rectangular shape. Consequently, when the secondary battery of the exemplary embodiment is used with a substrate in a housing, the substrate can be set to the cutout portion of the secondary battery, and, at the same time, the substrate thus set and the external terminal can be arranged closer to each other.

In the exemplary embodiment in which the external terminal is provided on the battery surface forming the cutout portion, the same surface of the secondary battery in which the external terminals of the positive electrode and the negative electrode are provided adjacent to each other corresponds to the battery side surface of the battery cutout portion forming a non-rectangle. Since the external terminal is suitably provided for such a unique battery side surface, the arrangement design of the external terminal in consideration of a unique shape as a non-rectangle can be more suitably realized in the present invention.

It is noted that other details such as further details and further specific aspects of the secondary battery of the present invention are described above, and therefore the description thereof is omitted to avoid duplication.

Although the exemplary embodiments of the present invention have been described above, those are merely typical examples. Therefore, the present invention is not limited to those embodiments, and those skilled in the art will readily understand that various aspects can be conceived.

In general, it is noted that the secondary battery according to the exemplary embodiments is configured for use in various fields for electricity storage. For example, although the followings are merely examples, the secondary battery can be used in electricity, information and communication fields where mobile devices and the like are used (e.g., mobile device fields, such as mobile phones, smart phones, laptop computers, digital cameras, activity meters, arm computers, and electronic papers), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, and home-installation type power storage systems), IoT fields, and space and deep sea applications (e.g., the fields such as spacecraft and research submarines).

DESCRIPTION OF REFERENCE SYMBOLS

1: Positive electrode
2: Negative electrode
3: Separator
5: Electrode layer
10: Electrode precursor laminate
11: Narrow portion
12: Wide portion
50: Winding axis
60: Terminal element
61: Extending direction (longitudinal direction of terminal element)
65: Lead
65A: Positive electrode lead
65B: Negative electrode lead
70: Sealant material
80: Inactive material area
90: External terminal
100': Electrode winding body
100: Secondary battery

The invention claimed is:

1. A method of manufacturing a secondary battery having an electrode winding body that includes a positive electrode and a negative electrode, and has a non-rectangular shape in a planar view thereof, the manufacturing method comprising:

forming an electrode precursor laminate by stacking a positive electrode precursor on a negative electrode precursor with a separator interposed therebetween; and winding the electrode precursor laminate to form the electrode winding body, with the winding performed about a winding axis that is substantially parallel to an extending direction of a terminal element of the secondary battery, wherein the electrode precursor laminate has a comb-teeth shape in the planar view and the electrode winding body is a non-rectangular shape in the planar view thereof, wherein the winding of the electrode precursor laminate is performed such that a middle of each of a narrow portion and a wide portion in the comb-teeth shape is configured as a bending location in the winding and the terminal element is disposed in the narrow portion of the comb-teeth shape, and wherein the narrow and wide portions each have a width extending in a direction parallel to the winding axis and the width of the narrow portion is less than the width of the wide portion.

2. The method of manufacturing a secondary battery according to claim 1, further comprising flattening an overall three-dimensional shape of the electrode winding body.

3. The method of manufacturing a secondary battery according to claim 1, wherein the electrode precursor laminate has an elongated shape, and a longitudinal direction of the elongated shape is substantially orthogonal to the extending direction of the terminal element.

4. The method of manufacturing a secondary battery according to claim 1, wherein the terminal element is located at an end of the electrode precursor laminate, and the end is configured as a start point of the winding of the electrode precursor laminate.

5. The method of manufacturing a secondary battery according to claim 4, wherein the terminal element comprises a lead that is disposed at the end of the electrode precursor laminate.

6. The method of manufacturing a secondary battery according to claim 5, further comprising:

forming an inactive material area by not providing an electrode active material to an electrode current collector in at least one of the positive electrode precursor and the negative electrode precursor; and connecting the lead to the inactive material area.

7. The method of manufacturing a secondary battery according to claim 5, further comprising:

using a positive electrode lead for the positive electrode and a negative electrode lead for the negative electrode, wherein, in the electrode precursor laminate, the positive electrode lead and the negative electrode lead do not face each other in a stacking direction of the electrode precursor laminate and are adjacent to each other in a planar view of the electrode precursor laminate.

8. The method of manufacturing a secondary battery according to claim 1, wherein the positive electrode and the negative electrode have a layer configured for inserting and extracting lithium ions.

9. A secondary battery comprising:

an electrode winding body including a positive electrode, a negative electrode, and a separator disposed therebetween, with the electrode winding body including a winding structure in which the positive electrode, the negative electrode, and the separator are integrally wound; and an exterior body that wraps the electrode winding body, wherein the secondary battery comprises a non-rectangular shape in a planar view thereof with a narrow portion and wide portion, wherein a winding axis of the winding structure is substantially parallel to an extending direction of a terminal element of the secondary battery, wherein the narrow portion and wide portion each have a width extending parallel to the winding axis, with the width of the narrow portion being less than the width of the wide portion, and wherein each of the positive electrode, the negative electrode and the separator has a comb-teeth shape in a non-wound state and the terminal element is disposed in the narrow portion of the comb-teeth shape.

10. The secondary battery according to claim 9, wherein the terminal element extends from a winding start point of the winding structure.

11. The secondary battery according to claim 9, wherein an overall three-dimensional shape of the secondary battery is flat.

12. The secondary battery according to claim 9, wherein the terminal element is positioned at an intermediate level of thickness of the secondary battery.

13. The secondary battery according to claim 9, wherein a boundary between the narrow portion and the wide portion in the comb-teeth shape comprises a bending location.

14. The secondary battery according to claim 9, further comprising respective external terminals of the positive electrode and the negative electrode that are disposed adjacent to each other on a same surface of the secondary battery and are configured as the terminal element.

15. The secondary battery according to claim 14, wherein the same surface corresponds to a battery side surface of a battery cutout that forms the non-rectangular shape.

16. The secondary battery according to claim 9, wherein the positive electrode and the negative electrode of the electrode winding body have a layer configured for inserting and extracting lithium ions.

* * * * *